(12) United States Patent
Koide

(10) Patent No.: US 6,280,040 B1
(45) Date of Patent: Aug. 28, 2001

(54) OPTICAL APPARATUS

(75) Inventor: Wataru Koide, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/420,499

(22) Filed: Oct. 19, 1999

(30) Foreign Application Priority Data

Oct. 20, 1998 (JP) .................................................. 10-298686

(51) Int. Cl.$^7$ ............................ G02B 21/00; G03B 11/04
(52) U.S. Cl. ........................ 359/600; 359/511; 359/611; 359/236
(58) Field of Search .................................. 369/227–235, 369/407–410, 425, 477, 480–482, 507–508, 511, 513, 600, 608–612, 738–740, 699–701; 396/448–451

(56) References Cited

U.S. PATENT DOCUMENTS

| 4,876,563 | * | 10/1989 | Ishida et al. | 396/448 |
| 5,051,765 | * | 9/1991 | Yoshizaki et al. | 396/448 |
| 5,294,954 | * | 3/1994 | Nomura et al. | 359/511 |
| 5,408,359 | * | 4/1995 | Ferrett et al. | 359/600 |
| 5,602,607 | * | 2/1997 | Kato et al. | 396/448 |
| 5,623,367 | * | 4/1997 | Immel | 359/600 |

* cited by examiner

*Primary Examiner*—Thong Nguyen
(74) *Attorney, Agent, or Firm*—Ostrolenk, Faber, Gerb & Soffen, LLP

(57) ABSTRACT

An optical apparatus according to the present invention has an eyepiece side body internally equipped with a diopter adjusting ring for diopter adjustment of an eyepiece, a barrier, an eyecup ring including a driving pin for opening and closing the barrier and a cam groove for advancing and retreating an eyecup fitted in an eyecup ring. When the eyecup ring is rotated counterclockwise, the barrier is rotated up to an opening position, and when further rotated, the eyecup is twisted up. When operated in the reverse direction, the eyecup is drawn in and the barrier is rotated to a closing position. It is possible to easily accomplish the moving and opening/closing operations for protecting a hood member (eyecup) and an optical system (eyepiece), and the structures thereof are simple.

24 Claims, 16 Drawing Sheets

OPTICAL APPARATUS

BACKGROUND OF THE INVENTION

1. Field of the Invention

The present invention relates to an optical apparatus including a barrier member for protecting an optical system and a hood member (eyecup member) adapted to contact a viewer.

2. Description of the Related Art

In general, an optical apparatus such as a telescope (binoculars, monocular, and others) is constructed such that an objective and an eyepiece are set at the front and rear end portions of a lens barrel in an exposed state. In this state, the telescope incurs attachment of dust, greases or the like on the surfaces of the lenses, if it is left as is when not in use, so that there is a possibility of damage to the lenses when the attached dust or the like is removed therefrom. For this reason, lens caps have been used as lens protective members for the objectives and eyepieces of the right- and left-hand lens barrels.

Since the lens cap is fitted over the barrel circumferential surface only under contact pressure, there is a possibility that it easily may be removed therefrom by an external force or the like. For preventing such removal, there has been proposed an optical apparatus in which one end of the lens cap is connected through a string-like member to the barrel body.

In addition, if the optical apparatus such as binoculars, a monocular or a telescope is used in the daytime, unwanted light such as sunlight comes in from the eyepiece side, making viewing difficult. Accordingly, an eyecup (viewing opening) forming a hood member is commonly mounted on the aforesaid optical apparatus.

However, in the case of the above-mentioned conventional optical apparatus in which the lens cap is connected through a string-like member to the barrel body, it becomes hard to handle because the lens cap is unstable while being removed and presents an appearance that is unacceptable. Additionally, when a person wearing spectacles uses the conventional optical apparatus where the eyecup is set upright, this requires shifting the eyecup because the distance between the viewer's eyes(s) and the eyepiece(s) becomes great, making viewing difficult. As with removal of the lens cap, operation of the eyecup overlap becomes troublesome and makes observation hard.

SUMMARY OF THE INVENTION

Accordingly, the present invention has been developed in consideration of the above-mentioned problems. It is an object of the invention to provide an optical apparatus with a simple structure, which is capable of easily accomplishing the movement and opening and closing operations of a barrier member for protecting a hood member and an optical system.

For this purpose, according to an aspect of this invention, an optical apparatus comprises an optical system, a hood member and a barrier member positioned between one end portion of the hood member and an end portion of the optical system to be movable to a position for protecting the optical system and further to a position for retreating from the optical system, with the barrier member being moved to the position for protecting the optical system or retreated from the optical system.

In addition, according to another aspect of this invention, an optical apparatus comprises an optical system, a hood member, a barrier member positioned between one end portion of the hood member and an end portion of the optical system to be movable to a position for protecting the optical system and further to a position for retreating from the optical system, and a holding member for holding the barrier member so that the barrier member is openable and closable and for holding the hood member so that the hood member is movable in a direction of an optical axis, with the barrier member being held by the holding member to be openable and closable while the hood member is held by the holding member to be movable in the optical axis direction.

The object and features of the present invention will become more readily apparent from the following description.

DESCRIPTION OF PREFERRED EMBODIMENTS

Embodiments of the present invention will be described hereinbelow with reference to the drawings.

Figure 1:
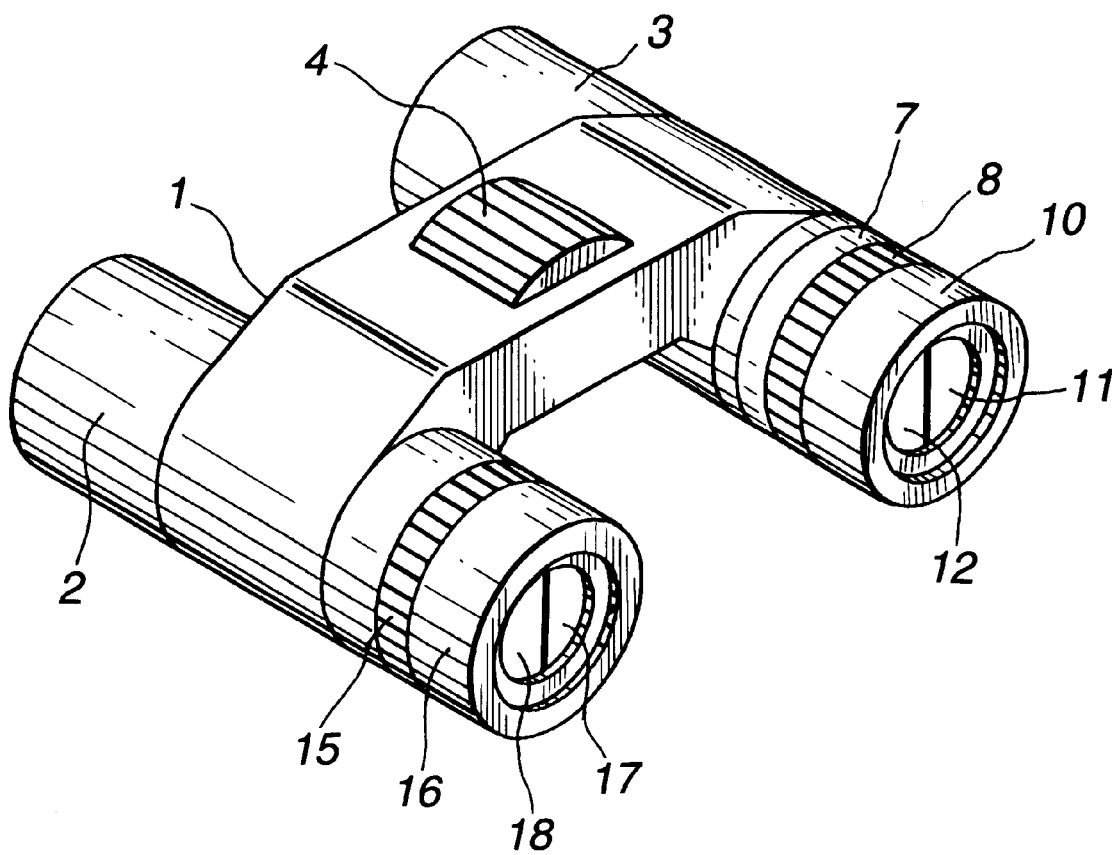
FIG. 1 is a perspective view showing an appearance of binoculars forming an optical apparatus according to a first embodiment of the present invention.
Figure 2:
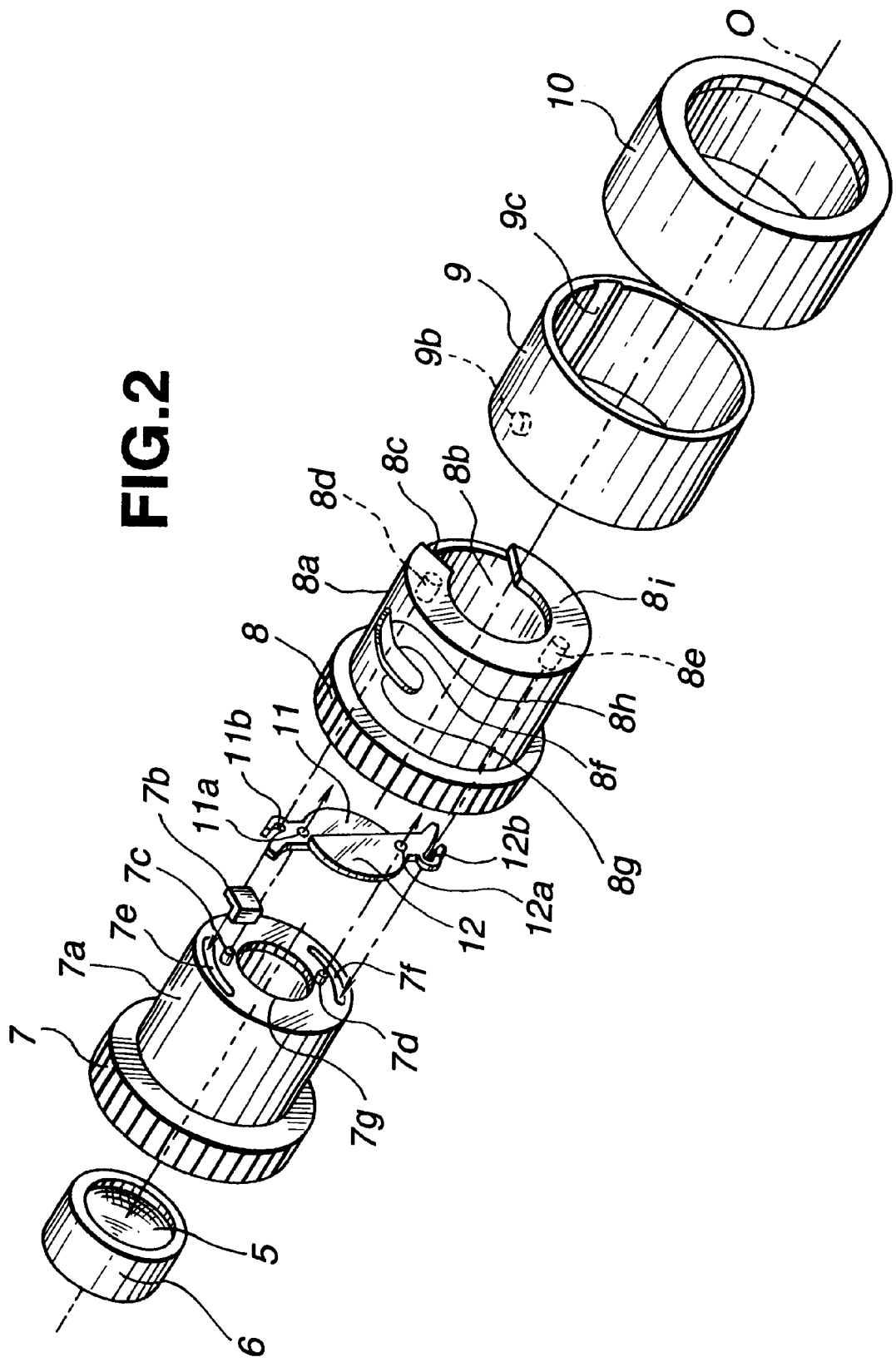
FIG. 2 is an exploded perspective view showing a diopter adjusting section and a barrier/eyecup section incorporated into an eyepiece side of a right-hand lens barrel of the binoculars according to the first embodiment.

FIG. 1 is a perspective view showing an appearance of binoculars forming an optical apparatus according to a first embodiment of this invention, and FIG. 2 is an exploded perspective view showing a diopter adjusting section and a barrier/eyecup section incorporated into an eyepiece side of a right-hand lens barrel of these binoculars.

The binoculars according to this embodiment are basically made up of a binocular body (main body of binoculars) 1, left-and right-hand lens barrels 2 and 3, each including a viewing optical system, and a focusing ring 4. Furthermore, into the eyepiece side of the left-hand lens barrel 2 there are incorporated an eyecup ring 15, an eyecup 16, barriers 17 and 18 and other components constituting a barrier/eyecup section (a barrier section and an eyecup section), while into the eyepiece side of the right-hand lens barrel 3 there are incorporated a diopter adjusting ring 7 constituting a diopter adjusting section, and an eyecup 10, barriers 11 and 12 and other components constituting a barrier/eyecup section (a barrier section and an eyecup section).

A description will be given hereinbelow of the structures of the diopter adjusting section and the barrier/eyecup section to be built in these binoculars. In this description, the structure of the barrier/eyecup section on the left-hand lens barrel 2 side is the same as that of the eyecup section on the right-hand lens barrel 3 side, thus the description will be limited to that on the right-hand lens barrel 3 side.

As FIG. 2 shows, the aforesaid diopter adjusting section is constructed with the diopter adjusting ring 7. Furthermore, the aforesaid barrier/eyecup section is composed of an eyecup ring 8 serving as a holding means for holding a barrier member, an eyecup frame 9, the eyecup (viewing opening) 10 forming a rubber-made hood member (eyecup member) to be fitted in the eyecup frame 9 under pressure, and the barriers 11 and 12 acting as the barrier member.

In the diopter adjusting ring 7, an eyepiece frame 6 for holding an eyepiece 5 is internally maintained, but allowed to advance and retreat. Additionally, on a barrier side end surface section there are an L-shaped projection 7b, barrier supporting pins 7c and 7d, relief elongated holes 7e and 7f, and an opening portion 7g at an end portion position of the eyepiece 5.

The barriers 11 and 12 have sheltering portions for opening and closing the opening portion 7g and includes supporting holes 11a and 12a and rotationally driving notches 11b and 12b. These barriers 11 and 12 rotate around the supporting holes 11a and 12a by a rotational movement of the eyecup ring 8 which will be described hereinbelow, thereby opening and closing the opening portion 7g.

The eyecup ring 8 is fitted over an outer circumferential portion 7a of the diopter adjusting ring 7 to be slidable (capable of sliding) and rotatable, and is provided with a cam groove 8f formed on its outer circumferential surface 8a, a wall portion 8i serving as a barrier guide in the thickness direction, a notch 8c made in a manner that a portion of the wall portion 8i is cut and into which the projection 7b of the diopter adjusting ring 7 is inserted rotatably, and driving pins 8d and 8e placed in the interior of the wall portion 8i to engage with the barrier notches 11b and 12b. Additionally, the cam groove 8f is composed of a circumferential-direction cam groove portion 8g made along a circumferential direction of an optical axis O and an inclined cam groove 8h inclined with respect to the optical axis O. Although this eyecup ring 8 is rotatable relative to the diopter adjusting ring 7, its movement in the optical axis direction is limited by an axis-direction limiting section (not shown).

The eyecup frame 9 is a member fitted over the outer circumferential section 8a of the eyecup ring 9 to be slidable and rotatable, and has, in its inner circumferential section, a semi-spherical projection 9b fitted in the eyecup ring cam groove 8f to be slidable and a guide groove 9c in which the diopter adjusting ring projection 7b is fitted to be slidable along the optical axis O without play in rotating directions. Accordingly, the aforesaid eyecup frame 9 rotates together with the diopter adjusting ring 7 and is driven by the inclined cam groove portion 8g of the eyecup ring 8 to advance and retreat in the optical axis directions.

Next, a description will be given hereinbelow of an adjusting operation, an opening/closing operation and up-and-down operation of the diopter adjusting section and the barrier/eyecup section. In the description, the rotating directions of the members are rotating directions viewed from the eyepiece side (viewer side). This indication of the rotating directions are similarly used in other embodiments which will be described later.

Figure 3:
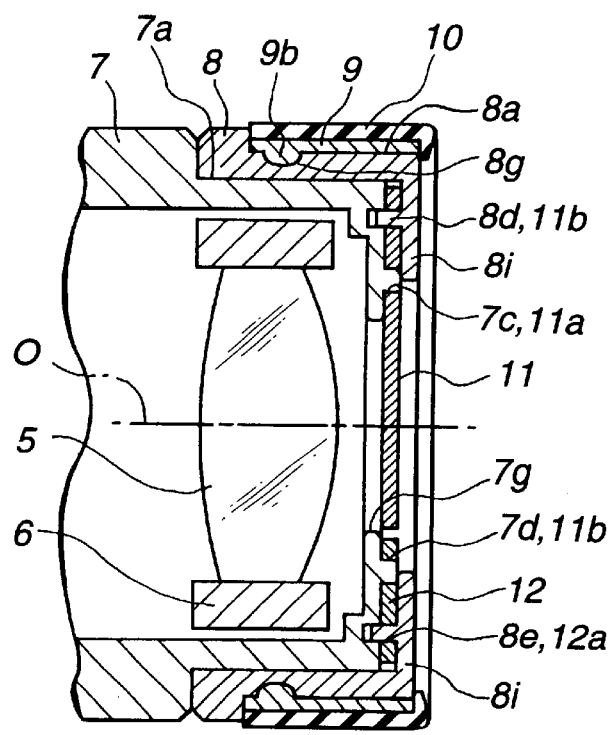
FIG. 3 is a longitudinal cross-sectional view showing the diopter adjusting section and the barrier/eyecup section of the binoculars according to the first embodiment which are in the storage state, where the barrier is in a closed condition and the eyecup is in a twist-down condition.
Figure 4:
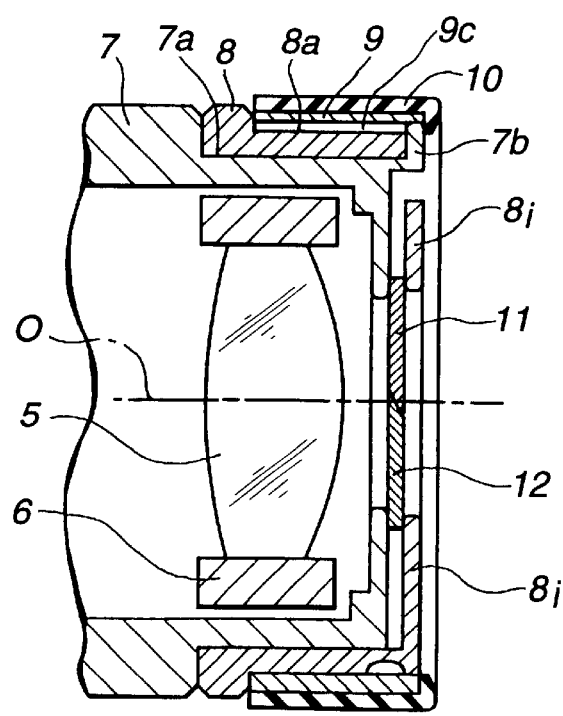
FIG. 4 is a transverse cross-sectional view showing the diopter adjusting section and the barrier/eyecup section of the binoculars according to the first embodiment which are in the storage state, where the barrier is in a closed condition and the eyecup is in a twist-down condition.
Figure 5:
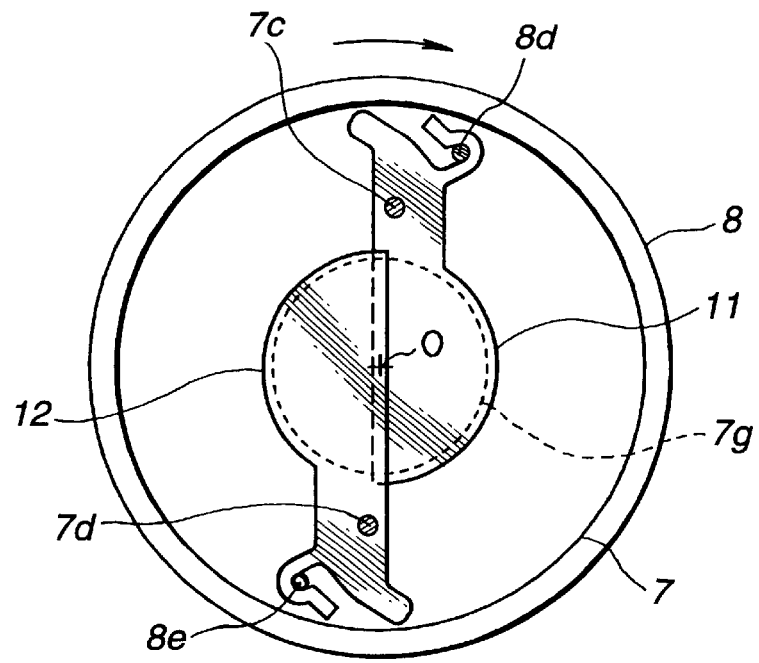
FIG. 5 is an illustration of a barrier section, being in a closed condition, in the binoculars according to the first embodiment which are in the storage state, viewed along the optical axis.

FIGS. 3, 4 and 5 are illustrations of the storage state of these binoculars, showing the diopter adjusting section and the barrier/eyecup section in a state where the barriers are in the closed condition and the eyecup is in the twist-down condition. FIG. 3 is a longitudinal cross-sectional view thereof, FIG. 4 is a transverse cross-sectional view thereof and FIG. 5 is an illustration of the barrier section, viewed along the optical axis direction.

Figure 6:
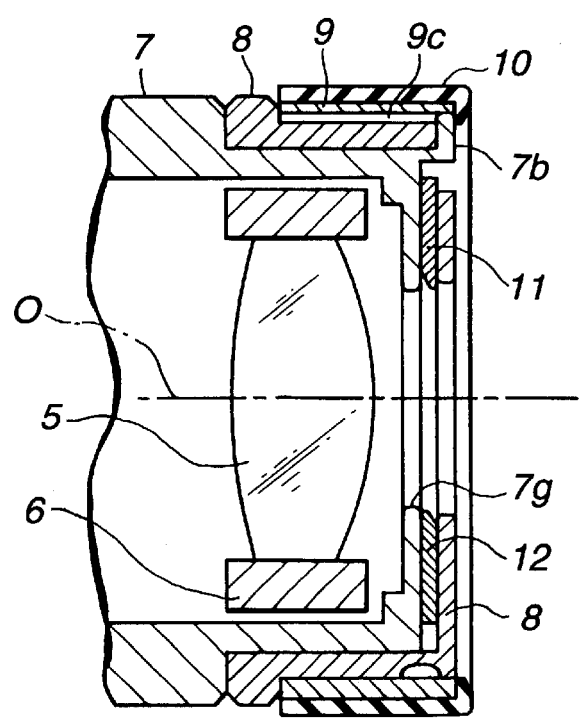
FIG. 6 is a transverse cross-sectional view showing the diopter adjusting section and the barrier/eyecup section of the binoculars according to the first embodiment which are in the non-stored state, where the barrier is in an open condition and the eyecup is in a twist-down condition.
Figure 7:
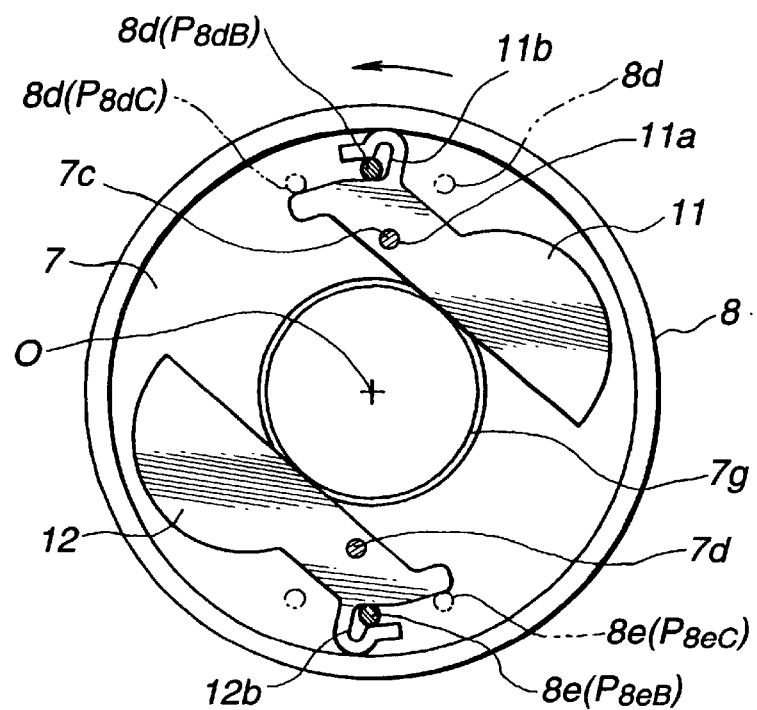
FIG. 7 is an illustration of the barrier section, being in an open condition, in the binoculars according to the first embodiment which are in the non-stored state, viewed along the optical axis.
Figure 8:
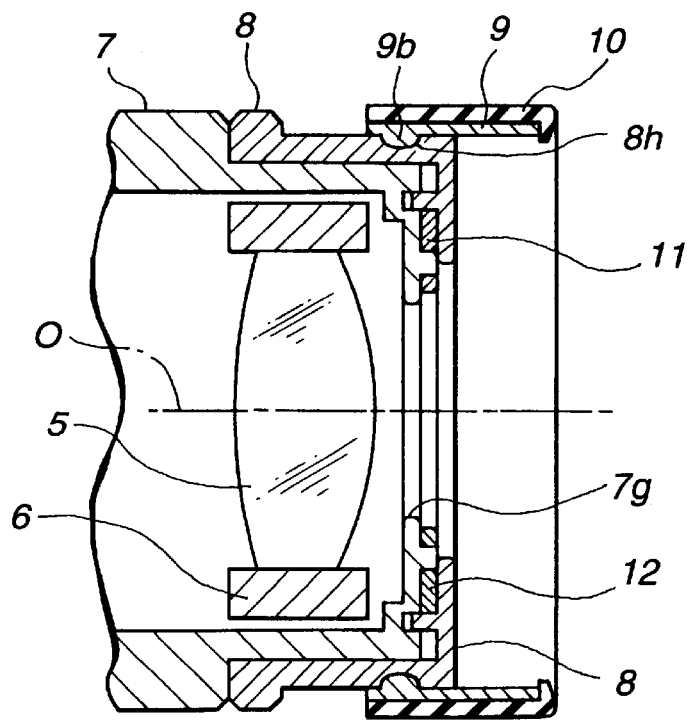
FIG. 8 is a longitudinal cross-sectional view showing the diopter adjusting section and the barrier/eyecup section in the binoculars according to the first embodiment which are in the non-stored state, where the barrier is in an open condition while the eyecup is in a twist-up condition.
Figure 9:
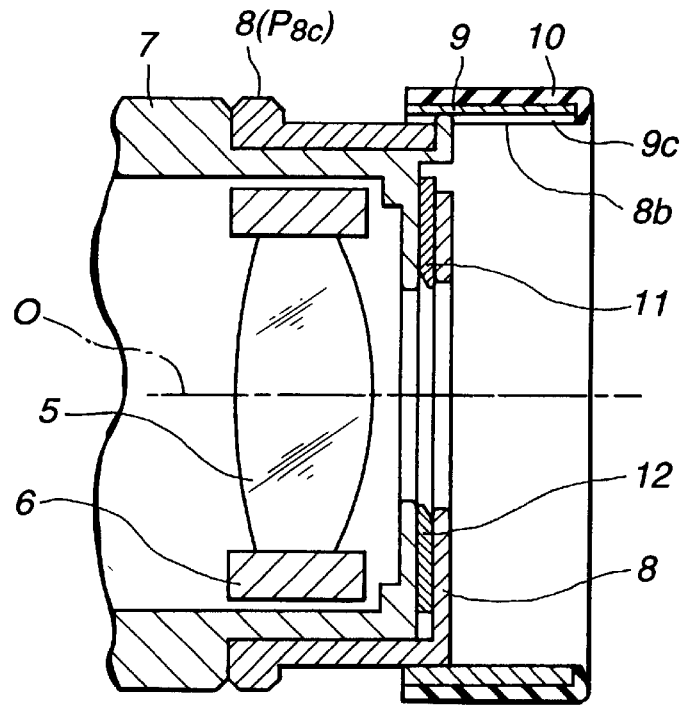
FIG. 9 is a transverse cross-sectional view showing the diopter adjusting section and the barrier/eyecup section in the binoculars according to the first embodiment which are in the non-stored state, where the barrier is in an open condition while the eyecup is in the twist-up condition.
Figure 10:
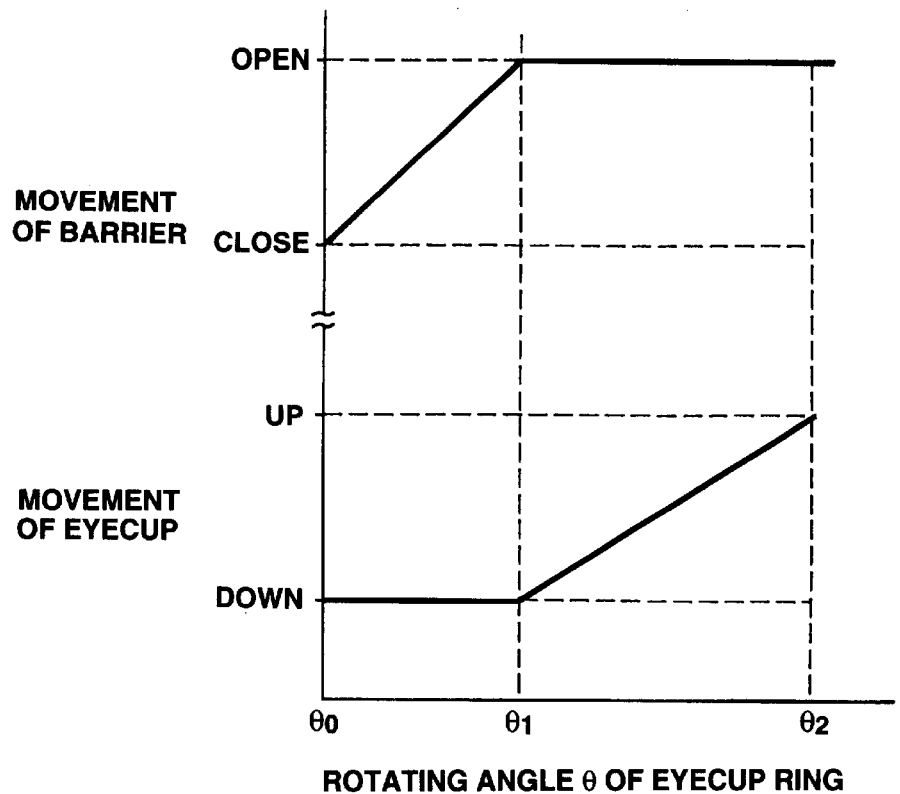
FIG. 10 is a graphical representation of movement of the barrier and movement (travel in optical axis directions) of the eyecup with respect to a rotating angle θ of an eyecup ring in the binoculars according to the first embodiment.

In addition, FIG. 6 is a transverse cross-sectional view showing a non-stored state of these binoculars, and illustrating the diopter adjusting section and the barrier/eyecup section in a state where the barriers are in the open condition and the eyecup is in the twist-down condition. FIG. 7 is an illustration of the barrier section, viewed along the optical axis direction. FIGS. 8 and 9 are, respectively, a longitudinal cross-sectional view and a transverse cross-sectional view, illustrating the non-stored state of these binoculars and showing the diopter adjusting section and the barrier/eyecup section where the barrier is in an open condition while the eyecup is in a twist-up condition. FIG. 10 is a graphical representation of movement of the barrier and movement (travel in optical axis directions) of the eyecup with respect to a rotating angle θ of the eyecup ring in these binoculars.

In response to a rotational operation of the aforesaid diopter adjusting ring 7, the right-hand eyepiece frame 6 is driven through an advancing/retreating mechanism (not shown) to advance and retreat to adjust the diopter. Whether in the storage state or non-stored state, the diopter adjusting ring 7 is operated rotationally, hence the barrier/eyecup section rotates integrally with the diopter adjusting ring 7.

When these binoculars are in the storage state, the eyecup ring 8 lies at the clockwisemost position with respect to the diopter adjusting ring 7 (position reached by the rotation up to θ0 in FIG. 10). The projection 9b stands at an end portion of the circumferential-direction cam groove portion 8g of the eyecup ring 8, reaching the twist-down position, having been drawn into the diopter adjusting ring 7 side as shown in FIG. 3. Furthermore, since the eyecup ring 8 is rotated fully clockwise, as shown in FIG. 5, the barriers 11 and 12 are driven clockwise by the driving pins 8d and 8e, respectively, and the opening portion 7g of the diopter adjusting ring 7 is sheltered so that the eyepiece 5 is maintained in the protected condition.

For switching to the non-stored state, the eyecup ring 8 is rotated counterclockwise by a predetermined angle, that is, over a range of the circumferential-direction cam groove portion 8g (from a rotational angle θ0 to a rotational angle θ1, as shown in FIG. 10). Due to this rotation, the barriers 11 and 12 are rotationally driven counterclockwise by the driving pins 8d and 8e, respectively, and the opening portion 7g is opened as shown in FIG. 7, thus permitting observation. Additionally, in this state, since the eyecup frame 9 is positioned so that the projection 9b is within the range of the circumferential-direction cam groove portion 8g, the eyecup 10 assumes the twist-down position as shown in FIG. 6.

For performing the twist-up operation of the eyecup 10 in the aforesaid non-stored state, the eyecup ring 8 is further rotated counterclockwise in a range defined by the inclined cam groove portion 8h (a range from a rotational angle θ1 to a rotational angle θ2 in FIG. 10). Owing to this rotation, the eyecup frame 9 is shifted along the inclined cam groove portion 8h toward the viewer side, and the eyecup 10 is shifted to the aforesaid twist-up position as shown in FIGS. 8 and 9. As shown in FIG. 7, the barrier driving pins 8d and 8e of the eyecup ring 8 moves from positions P8dB and P8eB to positions P8dC and P8eC, only sliding on the outer circumferential portions of the barriers 11 and 12. The barriers 11 and 12 do not rotate and are held at the closing positions without moving.

For the eyecup 10 to be held at an arbitrary position between the twist-down position and the twist-up position, the eyecup ring 8 may be rotated by an arbitrary angle within the range from the rotational angle θ1 to the rotational angle θ2 as shown in FIG. 10. Additionally, for twisting the eyecup 10 down from the twist-up state, an operation opposite to the above-described operation is conducted, that is, the eyecup ring 8 is merely returned clockwise up to the rotational angle θ1. Thereafter, for setting the barriers 11 and 12 to the closing states, the eyecup ring 8 is further returned to the rotational angle θ0.

With the above-described binoculars according to the first embodiment, the opening and closing operations of the barriers and the twist-up and twist-down of the eyecup can be achieved by rotational operation only of the eyecup ring 8 a single operating member which provides for easy-to-use operation. Additionally, the structures of the barrier section and the eyecup section are simple, thus leading to a compact configuration.

Next, a description will be given hereinbelow of binoculars forming an optical apparatus according to a second embodiment of the present invention.

Figure 11:
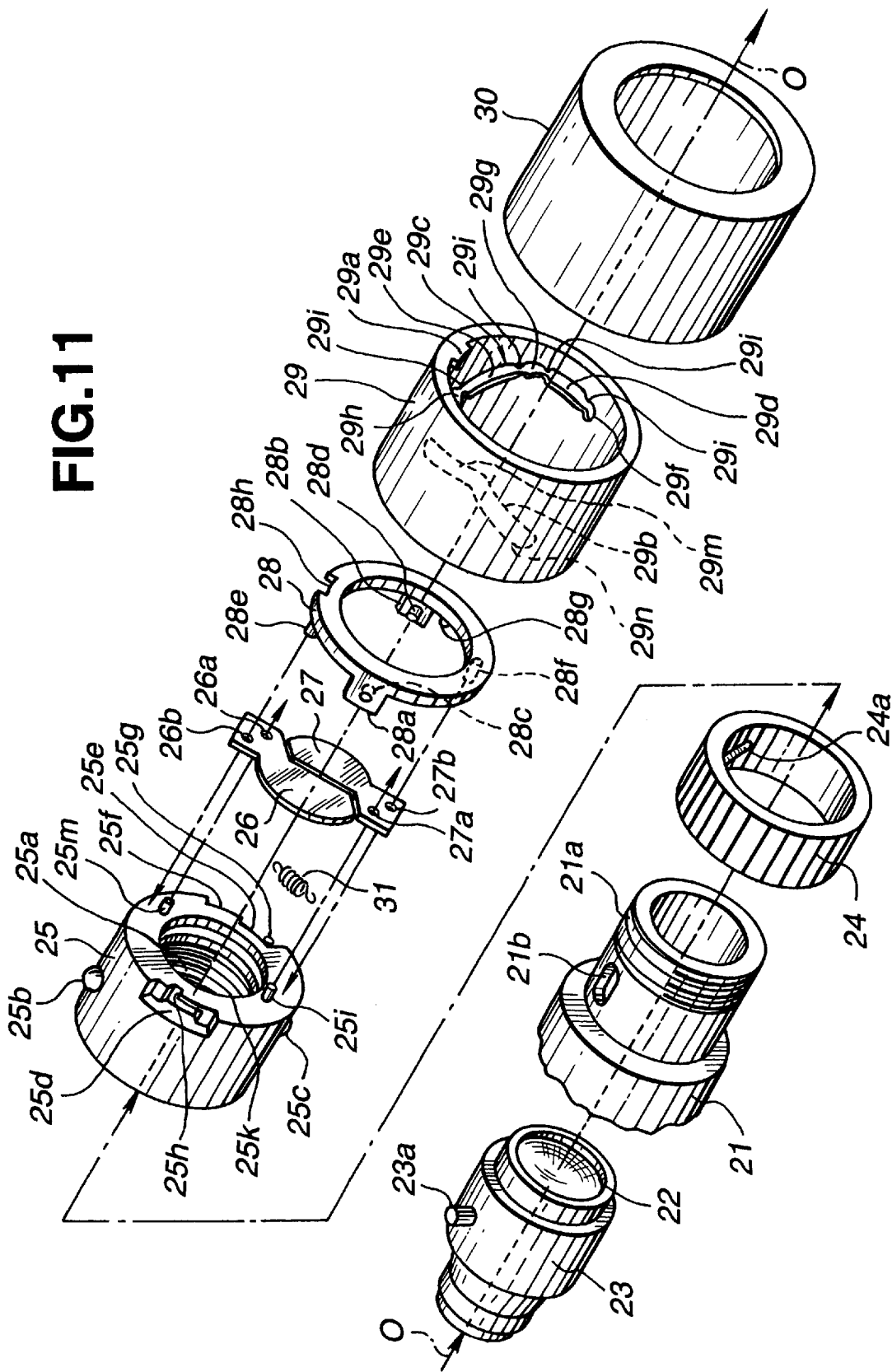
FIG. 11 is an exploded perspective view showing a diopter adjusting section and a barrier/eyecup section incorporated into an eyepiece side of a right-hand lens barrel of binoculars forming an optical apparatus according to a second embodiment of this invention.

FIG. 11 is an exploded perspective view showing a diopter adjusting section and a barrier/eyecup section incorporated into an eyepiece said of a right-hand lens barrel of these binoculars.

The binoculars according to this embodiment comprise a binocular body and left- and right-hand lens barrels (not shown), each internally including a viewing optical system, and a barrier/eyecup section (a barrier section and an eyecup section) incorporated into an eyepiece side of the left-hand lens barrel, while a diopter adjusting section and a barrier/eyecup section are incorporated into an eyepiece 22 side of the right-hand lens barrel.

A description of the structures of the diopter adjusting section and the barrier/eyecup section built in these binoculars will be made hereinbelow. The barrier/eyecup section on the left-hand lens barrel 2 side has the same structure as that of the barrier/eyecup section on the right-hand lens barrel side, thus the description thereof will be made of only the structure on the right-hand lens barrel side.

As FIG. 11 shows, the aforesaid diopter adjusting section is made up of a binocular eyepiece side body 21 supports an eyepiece frame 23, which holds an eyepiece 22 having an optical axis O, so that the eyepiece frame 23 can advance and retreat, and a diopter adjusting ring 24 supported rotatably by the body 21.

The eyepiece side body 21 is composed of a male screw 21a for fitting a supporting frame 25 and a guide hole 21b for advancing and retreating the eyepiece frame 23. The eyepiece frame 23 is slidable, a driving pin 23a of the eyepiece frame 23 being slidably received in the guide hole 21b. The diopter adjusting ring 24 is rotatably fitted over an outer circumferential portion of the body 21, and, in connection with the rotation of the diopter adjusting ring 24, the eyepiece frame 23 is driven through a cam groove 24a to advance and retreat, thereby adjusting the diopter.

The barrier/eyecup section is basically made up of the supporting frame 25 threadingly retaining the diopter adjusting ring 24 with respect to the eyepiece side body 21, barriers 26 and 27 serving as a barrier member capable of opening and closing an opening portion 25k provided at an end portion of the supporting frame 25, a barrier-driving rotatable arrow wheel 28, an eyecup frame 29 serving as a barrier member holding means rotatably fitted over an outer circumferential portion of the supporting frame 25 and capable of advancing and retreating, an eyecup (viewing opening) 30 acting as a rubber-made hood member fitted in the eyecup frame 29 under pressure, and a barrier opening spring 31 for driving the arrow wheel 28 clockwise to bias the barriers 26 and 27 in the opening directions.

The aforesaid supporting frame 25 is provided with a female screw portion 25a for fitting to the body 21, semi-spherical projections 25b and 25c for advancing and retreating the eyecup frame 29, barrier rotation supporting pins 25m and 25i, arrow wheel rotation limiting recess portions 25d and 25e having wall portions 25h and 25f for limiting the axial movement of the arrow wheel 28, a supporting pin 25g for supporting the barrier opening spring 31, and an eyepiece opening portion 25k.

The barriers 26 and 27 include a sheltering section for opening and closing the opening portion 25k, supporting holes 26a and 27a and rotational driving holes 26b and 27b. These barriers 26 and 27 rotate around the supporting holes 26a and 27a corresponding to the rotational movement of the eyecup 30, as will be discussed later, thereby opening and closing the opening portion 25k.

The arrow wheel 28, formed into a ring-like configuration, is equipped with axial limiting pins 28c and 28d fixedly secured to protruding portions 28a and 28b, driving pins 28e and 28f for rotating the barriers, a notch 28h made in its outer circumference, and a supporting pin 28g for supporting the barrier opening spring 31.

The position of the arrow wheel 28 with respect to the supporting frame 25 in the optical axis direction is limited by the limiting pins 28c and 28d inserted in the recess portions 25d and 25e of the supporting frame 25 and the wall portions 25h and 25f. Additionally, the rotating range of the arrow wheel 28 is limited by the protruding portions 28a and 28b and the inner surfaces of the recess portions 25d and 25e.

Still additionally, the driving pins 28e and 28f of the arrow wheel 28 are fitted in the driving holes 26b and 27b of the barriers 26 and 27 to drive the barriers 26 and 27 rotationally.

The aforesaid eyecup frame 29 is slidably and rotatably fitted over an outer circumference of the supporting frame 25 and is equipped with a projection 29a capable of engaging with the notch 28h of the arrow wheel 28 and symmetric cam grooves 29b and 29c made in its inner surface.

The cam grooves 29b and 29c comprise circumferential-direction cam groove portions 29m and 29d circumferentially extending about the optical axis O and inclined cam groove portions 29n and 29e inclined toward the front side (objective side).

In addition, the cam groove 29c has an end portion 29f of the circumferential-direction cam groove 29d, a switching portion 29g between the circumferential-direction cam groove portion 29d and the inclined cam groove portion 29e and an end portion 29h of the inclined cam groove portion 29e. Still further, a circumferentially-extending cam groove portion corresponds to each end portion 29f, the switching portion 29g and the end portion 29h, or, at the boundary portions, with respect to the inclined cam groove portions, a plurality of opposed, deformable microscopic projections 29i as adapted for click-holding the incoming projection 25c of the supporting frame 25.

Next, a description will be given hereinbelow of an adjusting operation, an opening and closing operation and an updown operation of the diopter adjusting section and the barrier/eyecup section in the binoculars constructed according to the second embodiment.

Figure 12:
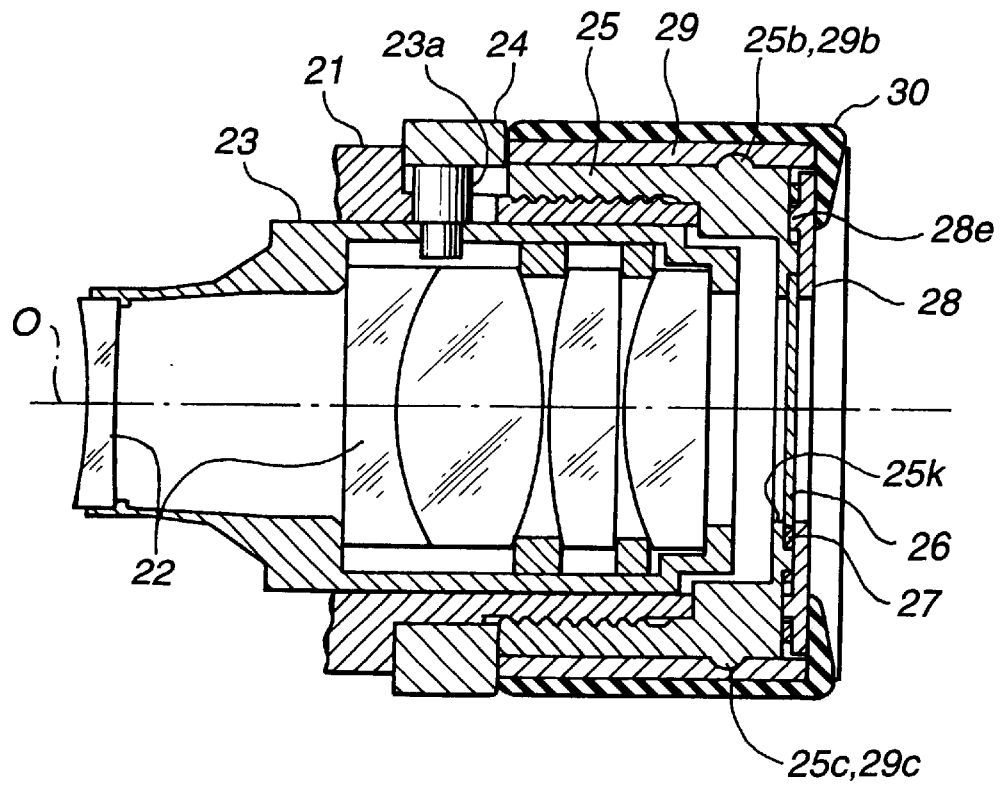
FIG. 12 is a longitudinal cross-sectional view showing a diopter adjusting section and a barrier/eyecup section in binoculars according to the second embodiment which are in the storage state, where the barrier is in a closed condition while the eyecup is in a twist-down condition.
Figure 13:
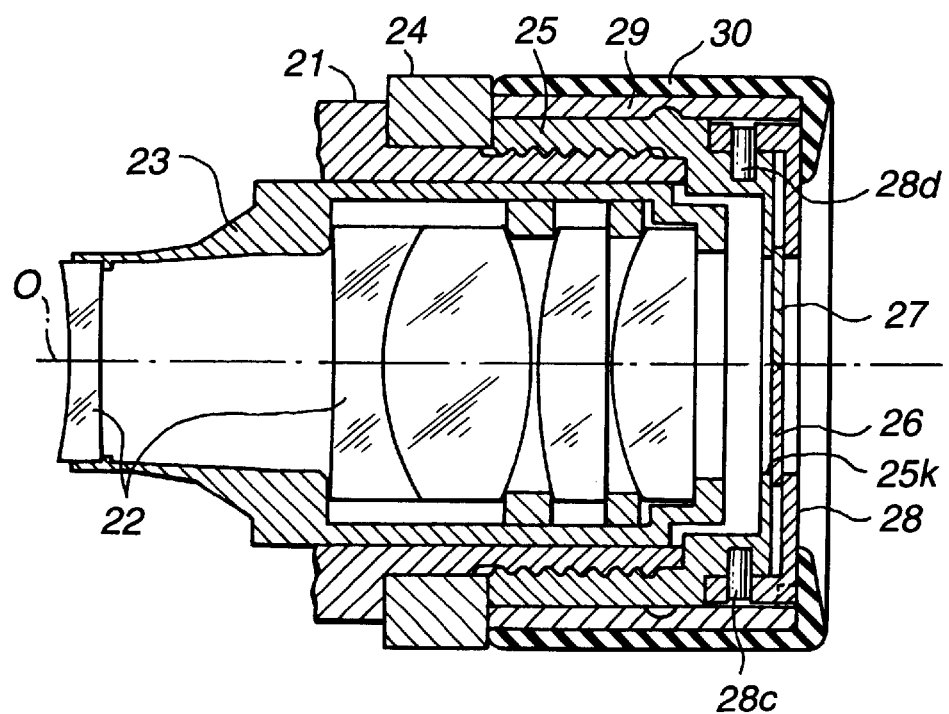
FIG. 13 is a transverse cross-sectional view showing the diopter adjusting section and the barrier/eyecup section in the binoculars according to the second embodiment which are in the storage state, where the barrier is in a closed condition while the eyecup is in the twist-down condition.
Figure 14:
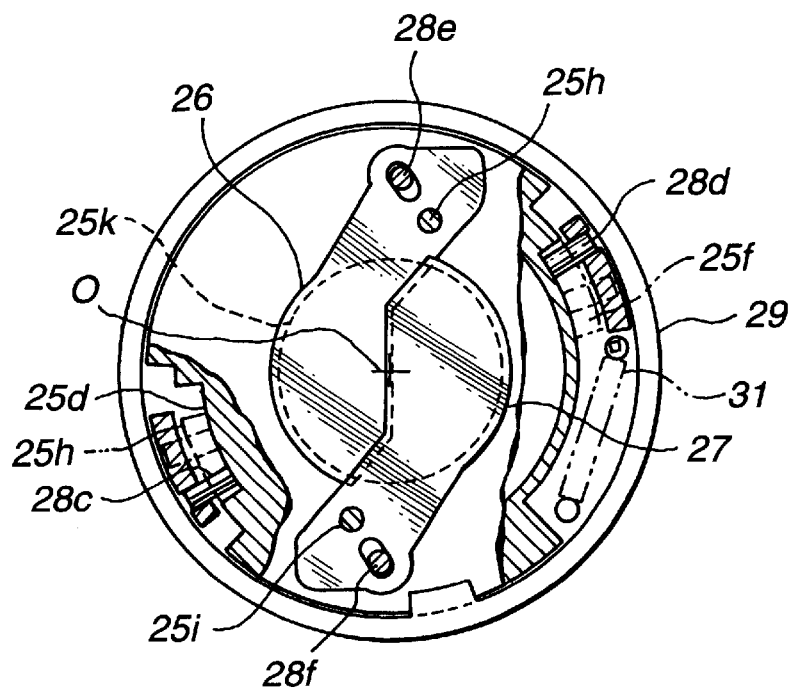
FIG. 14 is an illustration of a barrier section, being in a closed condition, in the binoculars according to the second embodiment which are in the non-using state, viewed along the optical axis.

FIGS. 12, 13 and 14 illustrate the storage state of these binoculars and show the diopter adjusting section and the barrier/eyecup section, where the barrier is in the closed condition while the eyecup is in the twist-down condition. FIG. 12 is a longitudinal cross-sectional view thereof, FIG. 13 is a transverse cross-sectional view thereof, and FIG. 14 is an illustration of the barrier section, viewed along the optical axis.

Figure 15:
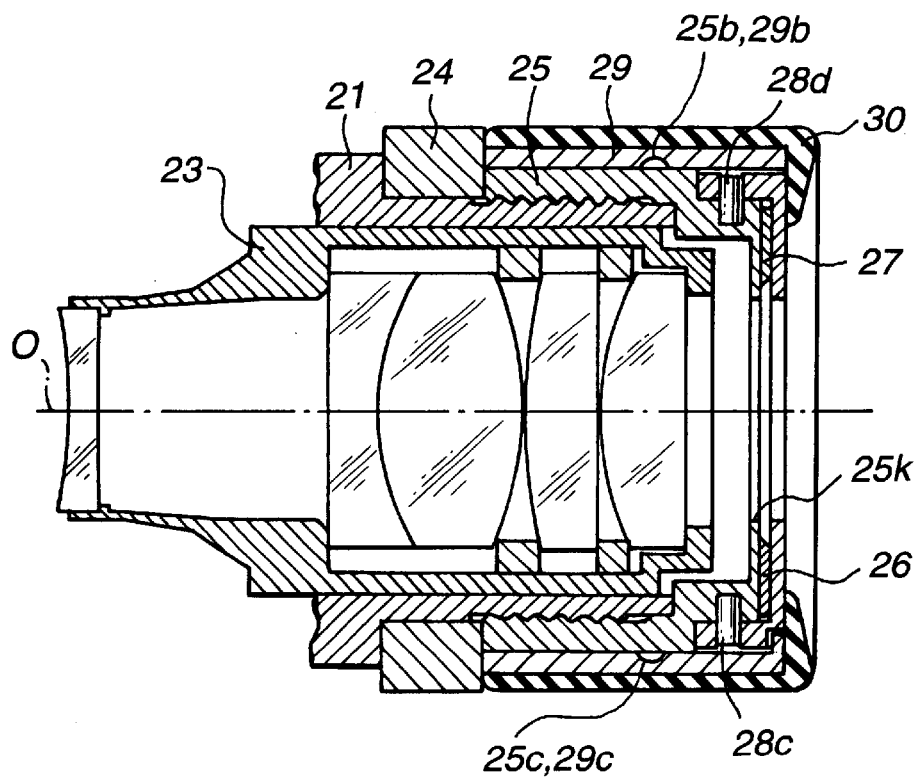
FIG. 15 is a transverse cross-sectional view showing the diopter adjusting section and the barrier/eyecup section in the binoculars according to the second embodiment which are in the non-stored state, where the barrier is in an open condition while the eyecup is in the twist-down condition.
Figure 16:
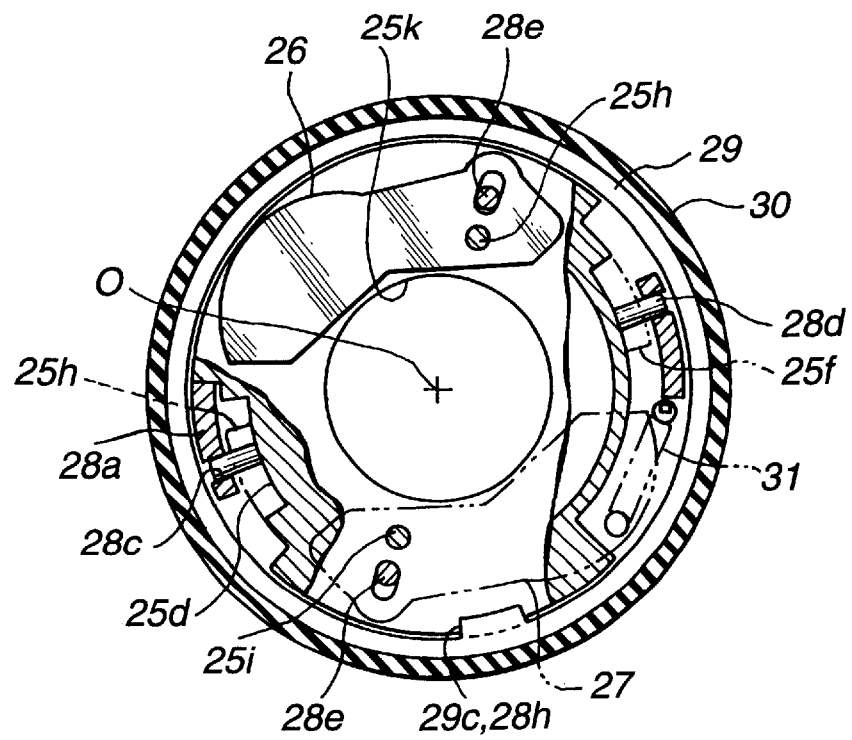
FIG. 16 is an illustration of the barrier section, being in an open condition, in the binoculars according to the second embodiment which are in the non-stored state, viewed along the optical axis.
Figure 17:
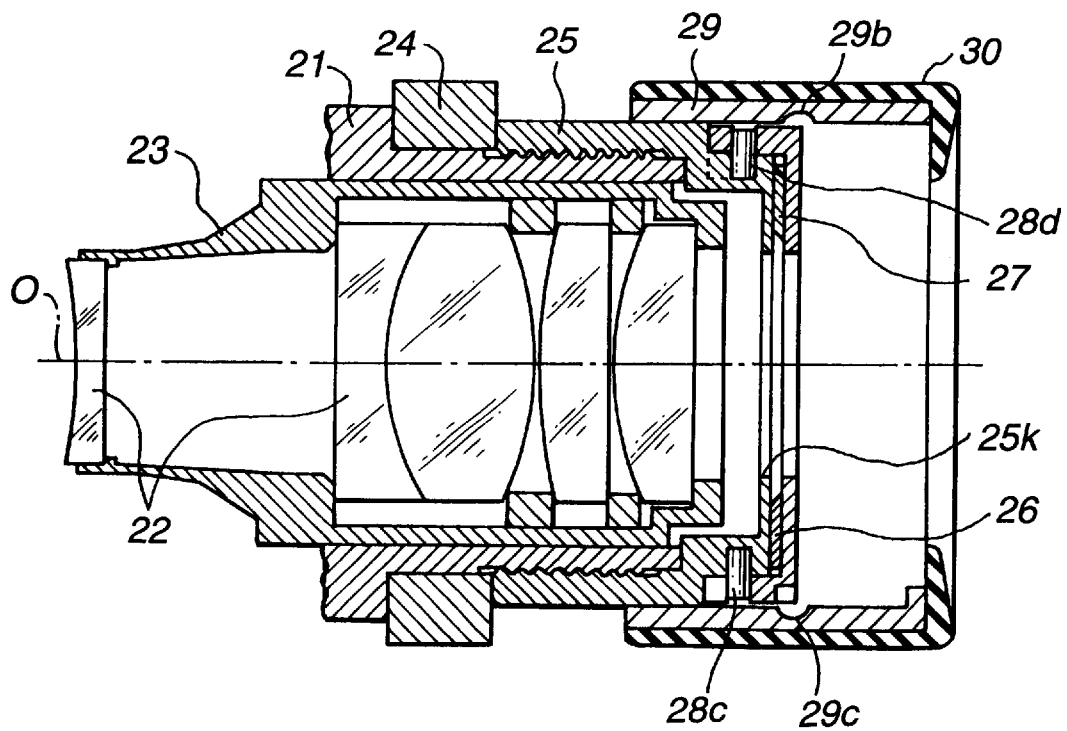
FIG. 17 is a longitudinal cross-section view showing the diopter adjusting section and the barrier/eyecup section in the binoculars according to the second embodiment which are in the non-stored state, where the barrier is in an open condition while the eyecup is in the twist-up condition.
Figure 18:
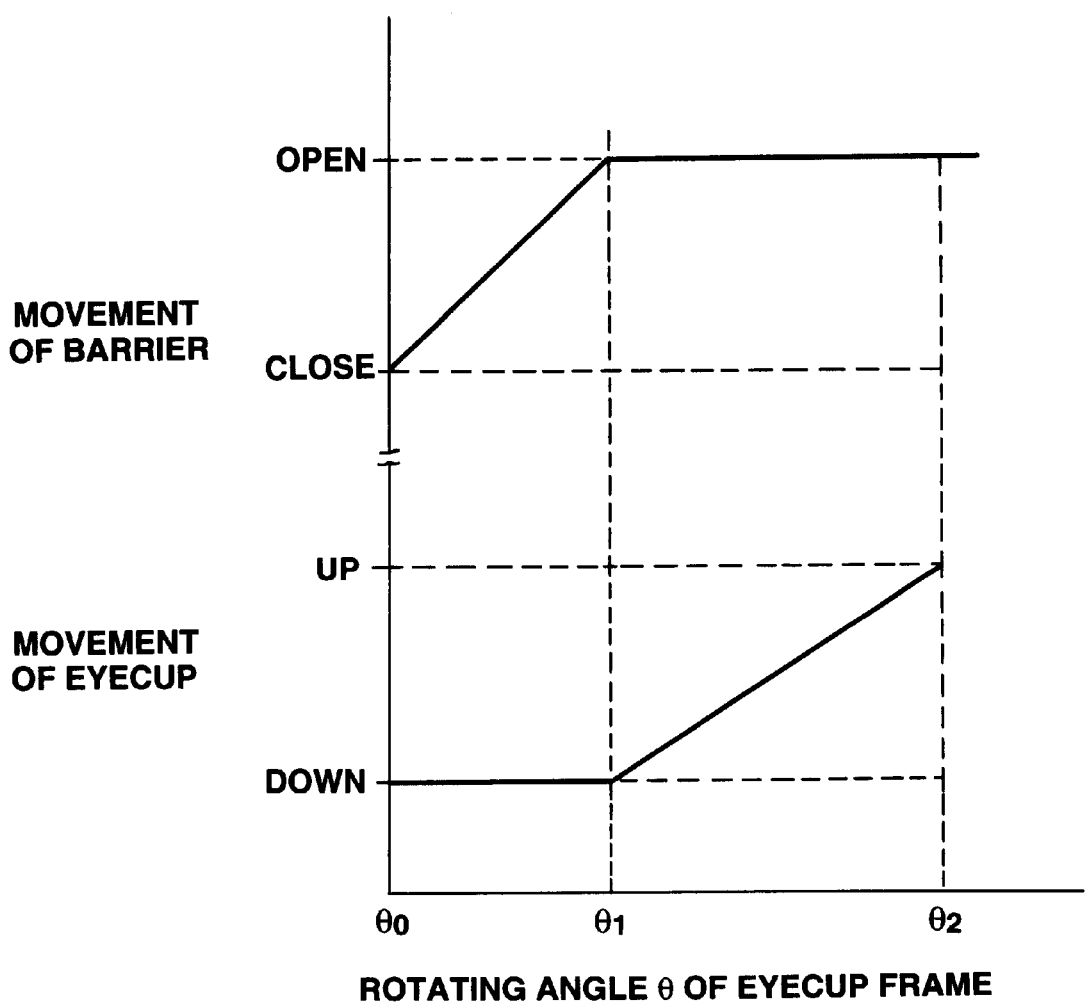
FIG. 18 is a graphical representation of movement of the barrier and movement (travel in optical axis directions) of the eyecup with respect to a rotating angle θ of an eyecup frame in the binoculars according to the second embodiment.

FIGS. 15 and 16 illustrate the non-stored state of these binoculars, with FIG. 15 being a transverse cross-sectional view showing the diopter adjusting section and the barrier/eyecup section where the barrier is in the open condition while the eyecup is in the twist-down condition, and FIG. 16 being an illustration of the barrier section, viewed along the optical axis. FIG. 17 shows the non-stored state of these binoculars, and is a transverse cross-sectional view showing the diopter adjusting section and the barrier/eyecup section where the barrier is in the open condition while the eyecup is in the twist-up condition. FIG. 18 is a graphical representation of movement of the barrier and movement (travel in optical axis directions) of the eyecup with respect to a rotating angle θ of the eyecup frame in these binoculars.

In a manner that the aforesaid diopter adjusting ring 24 is operated rotationally, the right-hand eyepiece frame 23 is driven through the driving pin 23a to advance and retreat to adjust the diopter.

When these binoculars are in the storage state, the eyecup 30 and the eyecup frame 29 are rotated up to the full counterclockwise position (fully counterclockwise rotated position) (a rotational position of θ0 in FIG. 18) with respect to the supporting frame 25, and the projections 25b and 25c come to the end portions of the circumferential-direction cam grooves 29m and 29d. Additionally, since the projection 29a of the eyecup frame 29 is inserted into the recess portion 28h of the arrow wheel 28, the arrow wheel 28 is also rotated to the full counterclockwise rotational position.

Accordingly, the eyecup 30 is, as shown in FIG. 12, at the twist-down position where it, together with the eyecup frame 29, is drawn in on the diopter adjusting ring 24 side. Additionally, because the arrow wheel 29 is at the full counterclockwise rotational position, as shown in FIG. 14, the barriers 26 and 27 are rotationally driven counterclockwise by the driving pins 28e and 28f and the opening portion 25k is sheltered. Incidentally, in this state, the opening spring 31 is in the extended condition, thus the arrow wheel 28 is subjected to a clockwise biasing force.

For switching these binoculars to the non-stored state, the eyecup 30 and the eyecup frame 29 are rotated clockwise by a predetermined angle, that is, over a range of the circumferential-direction cam groove portions 29d and 29m (from a rotational angle $\theta 0$ to a rotational angle $\theta 1$, as shown in FIG. 18), more specifically, until the projections 25b and 25c are fitted in the cam groove switching portions. At this time, the projection 29a and the recess portion 28h of the arrow wheel 29 are engaged, and the arrow wheel 28 is rotated integrally with the eyecup frame 29.

Due to the rotation of the arrow wheel 28, the barriers 26 and 27 are rotationally driven clockwise by the driving pins 28e and 28i, and the opening portion 25k is opened as shown in FIG. 16, permitting viewing. In this condition, the arrow wheel 28 experiences the clockwise biasing force by the opening spring 31. Additionally, the protruding portion 28a contacts the recess portion 25d of the supporting frame 25. Meanwhile, the eyecup 30 is held at the twist-down position as shown in FIG. 15.

For establishing the twist-up of the eyecup 30, while being shifted toward the view side along the optical axis, the eyecup 30 and the eyecup frame 29 are rotated clockwise within only the range of the inclined cam groove portions 29e and 29n (the range from a rotational angle $\theta 1$ to a rotational angle $\theta 2$ in FIG. 18), and the projections 25b and 25c are fitted in the end portions of the inclined cam groove portions 29n and 29e.

With this operation, the eyecup frame 29 is shifted along the optical axis O (toward the view side) while being rotated by the inclined cam groove portions 29e and 29n, and the eyecup 30 is shifted to the twist-up position as shown in FIG. 17. By the movement of the eyecup frame 29 along the optical axis O, the projection 29a withdraws from the recess portion 28h of the arrow wheel 28. However, as mentioned above, the arrow wheel 28 experiences the clockwise biasing by the barrier opening spring 31 and the protruding portion 28a is brought into contact with the end surface of the recess portion 25d; therefore, the rotational position of the arrow wheel 28 is maintained in that condition, while the barriers 26 and 27 are kept at the open position shown in FIG. 16.

In addition, for maintaining the eyecup 30 at a middle position between the twist-up position and the twist-down position, the eyecup 30 is stopped within the range from the rotational angel $\theta 1$ to the rotational angle $\theta 2$. Still, additionally, for twisting the eyecup 30 down from the twist-up condition, the reverse to the above-described operation is conducted, that is, the eyecup 30 is returned counterclockwise up to the rotational angle $\theta 1$, as shown in FIG. 18, while being returned to the side of the body 21. Moreover, for setting the barriers 26 and 27 to the closing states, the eyecup 30 is further returned up to the rotational angle $\theta 0$ as shown in FIG. 18.

With the above-described binoculars according to the second embodiment, the opening and closing operations of the barriers and the twist-up and twist-down of the eyecup can be achieved by the rotational operation of only the eyecup, a single operating member, which provides easy-to-use operation. Additionally, the structures of the barrier section and the eyecup section are simple, thus leading to a compact configuration.

Next, a description will be made hereinbelow of binoculars which form an optical apparatus according to a third embodiment of the present invention.

Figure 19:
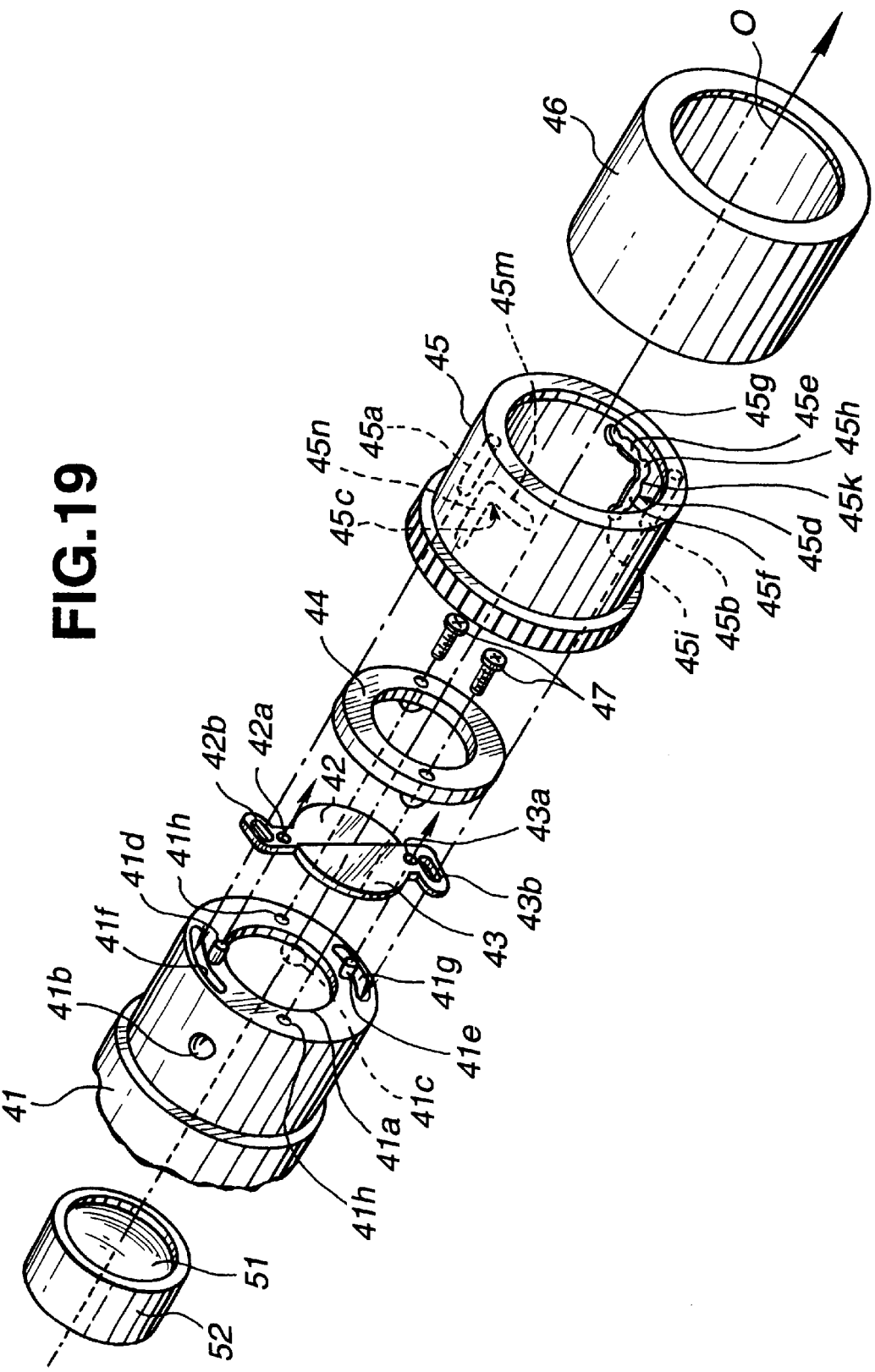
FIG. 19 is an exploded perspective view showing a barrier/eyecup section incorporated into an eyepiece side of a right-hand lens barrel of binoculars forming an optical apparatus according to a third embodiment of this invention.

FIG. 19 is an exploded perspective view showing a barrier/eyecup section (a barrier section and an eyecup section) to be incorporated into an eyepiece side of a right-hand lens barrel of these binoculars.

The binoculars according to this embodiment are basically equipped with a binocular body and left- and right-hand lens barrels (not shown), each including a viewing optical system. Furthermore, each of the eyepiece sides of the left- and right-hand lens barrels are provided with a barrier/eyecup section incorporated thereinto. A description will be made hereinbelow of the structure of the barrier/eyecup section incorporated into these binoculars. The barrier/eyecup sections of the left- and right-hand lens barrels have the same structure, thus the description will be given to only the structure of the barrier/eyecup section on the right-hand lens barrel side.

As FIG. 19 shows, the barrier/eyecup section is principally composed of an eyepiece side body 41 for holding an eyepiece frame 52 internally including eyepiece 51, barriers 42 and 43 serving as barrier members provided at an eyepiece end portion of the body 41 and capable of opening and closing an opening portion 41a, a barrier pressing plate 44 for limiting the barriers 42 and 43 in an axial direction, and eyecup frame 45 acting as a barrier member holding/driving means and fitted over an outer circumference of the eyepiece said body 41 to be capable of advancing and retreating, and an eyecup (viewing opening) 46 serving as a rubber-made hood member (eyecup member) fitted in the eyecup frame 45 under pressure.

In the eyepiece side body 41, there are provided an eyepiece opening portion 41a, semi-spherical projections 41b and 41c, barrier rotation supporting pins 41d and 41e, barrier driving pin relief holes 41f and 41g, and a screw hole 41h for attaching the barrier pressing plate 44.

The barriers 42 and 43 are equipped with a sheltering portion for opening and closing the opening portion 41a, supporting holes 42a and 43a, rotational driving holes 42b and 43b. These barriers 42 and 43 rotate around the supporting holes 42a and 43a in conjunction with the rotational operation of the eyecup 46, discussed below, thereby opening and closing the opening portion 41a.

The barrier pressing plate 44 is attached to the aforesaid body 41 with fasteners 47 threadingly engaging holes 41h to restrict axial and rotational movement of the barriers 42 and 43.

The eyecup frame 45 is slidably and rotatably fitted over an outer circumference of the eyepiece body 41 and has barrier driving pins 45a and 45b and cam grooves 45c and 45d internally.

The cam grooves 45c and 45d comprise circumferentially-extending cam groove portions 45m and 45e and straight (linear) cam groove portions 45n and 45f extending in the optical axis O direction. Furthermore, the cam groove 45d has an end portion 45g of the circumferentially-extending cam groove portion 45e, a switching portion 45h between the circumferentially-extending cam groove portion 45e and the straight cam groove portions 45f, and an end portion 45i of the straight cam groove portion 45e.

In addition, at the boundaries of the end portions 45g and 45i, the switching portion 45h and the cam grooves 45f and 45e, a plurality of opposed, deformable projections 45k provide for click-holding the projection 41c of the body 41 at the end portions and the switching portions.

Next, a description will be given hereinbelow of an opening and closing operation and an up-down operation of the barrier/eyecup section in the binoculars constructed according to the third embodiment.

Figure 20:
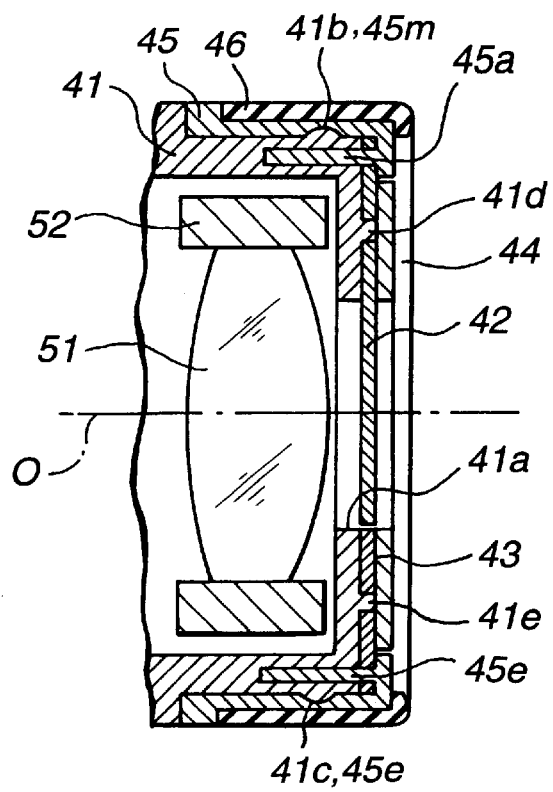
FIG. 20 is a longitudinal cross-sectional view showing a barrier/eyecup section in the binoculars according to the third embodiment which are in the stored state, where the barrier is in a closed condition while the eyecup is in a twist-down condition.
Figure 21:
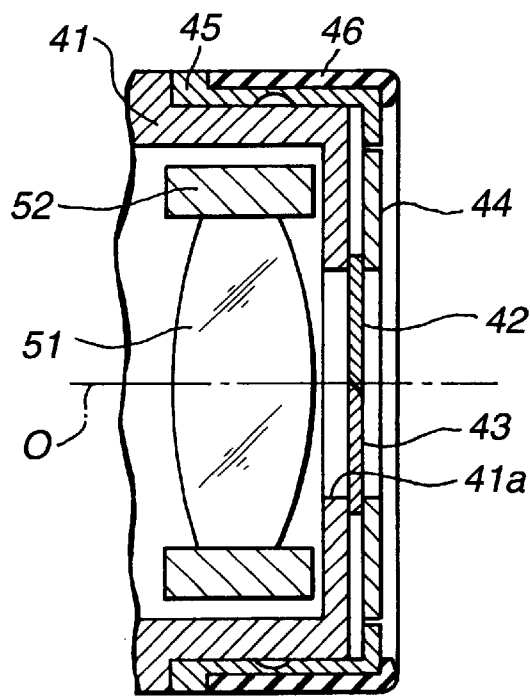
FIG. 21 is a transverse cross-sectional view showing a barrier/eyecup section in the binoculars according to a third embodiment which are in the stored state, where the barrier is in a closed condition while the eyecup is in a twist-down condition.
Figure 22:
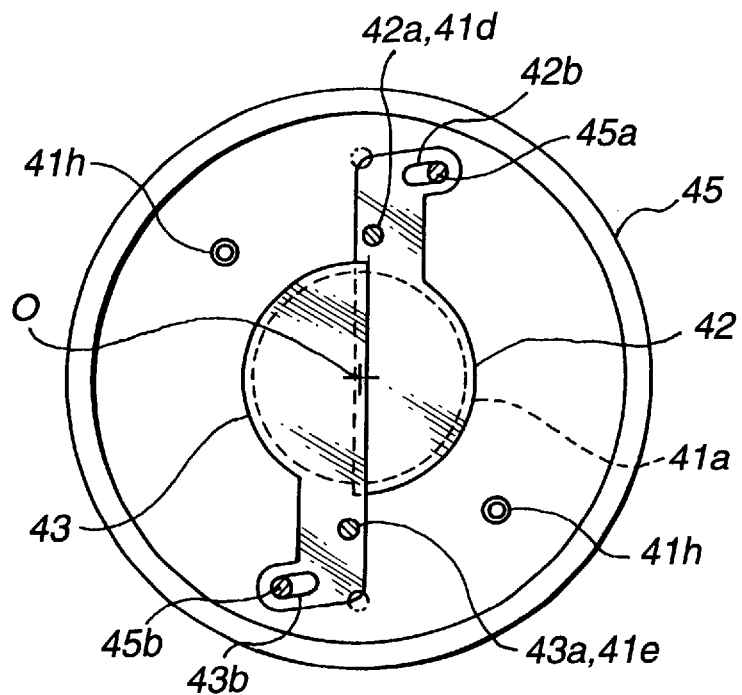
FIG. 22 is an illustration of a barrier section, being in a closed condition, in the binoculars according to a third embodiment which are in the stored state, viewed along the optical axis.

FIGS. 20, 21 and 22 illustrate the storage state of these binoculars, and show the barrier/eyecup section where the barrier is in the closed condition and the eyecup is in the down state. FIG. 20 is a longitudinal cross-sectional view thereof, FIG. 21 is a transverse cross-sectional view thereof, and FIG. 22 is an illustration of the barriers, viewed along the optical axis.

Figure 23:
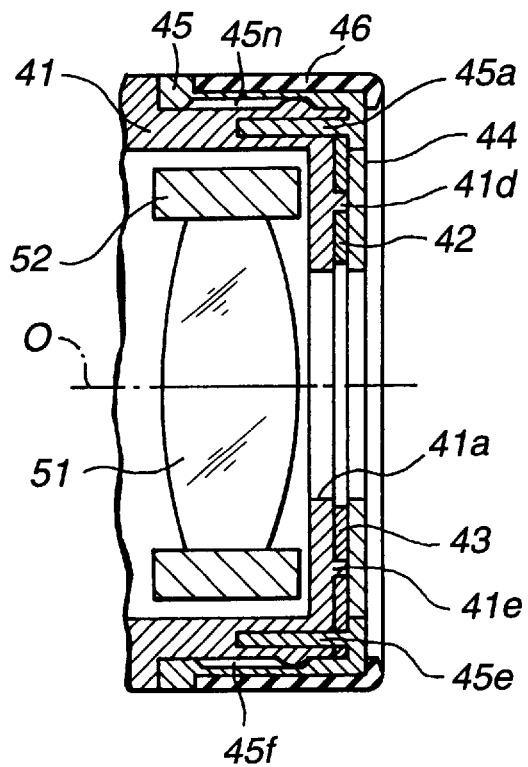
FIG. 23 is a longitudinal cross-sectional view showing the barrier/eyecup section in the binoculars according to the third embodiment which are in the non-stored state, where the barrier is in an open condition while the eyecup is in a twist-down condition.
Figure 24:
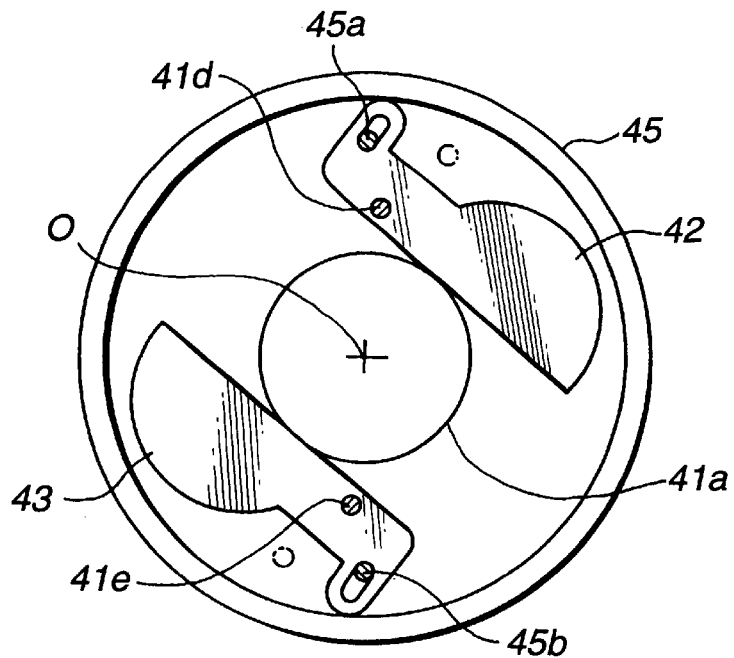
FIG. 24 is an illustration of the barrier section, being in an open condition, in the binoculars according to the third embodiment which are in the non-stored state, viewed along the optical axis.

FIGS. 23 and 24 show the non-stored state of these binoculars. FIG. 23 is a longitudinal cross-sectional view showing the barrier/eyecup section where the barrier is in the open condition and the eyecup is in the down condition, and FIG. 24 is an illustration of the barrier section, view along the optical axis.

Figure 25:
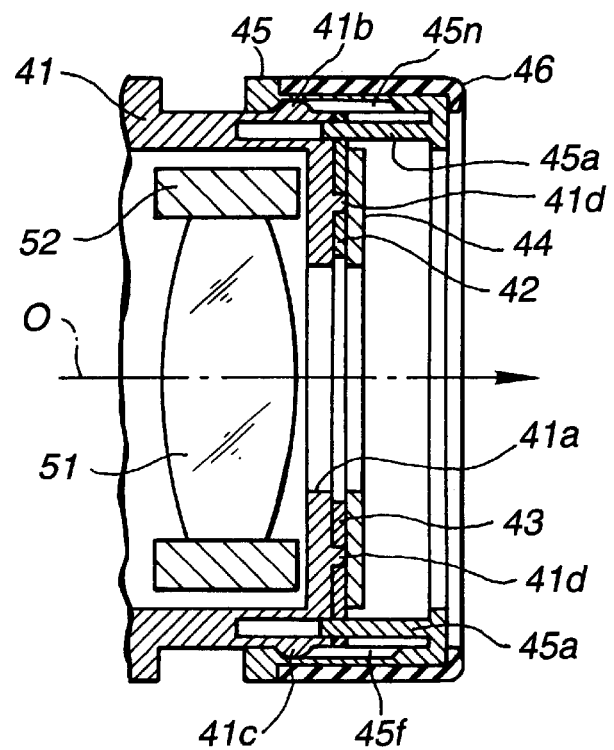
FIG. 25 is a longitudinal cross-sectional view showing the barrier/eyecup section in the binoculars according to the third embodiment which are in the non-stored state, here the barrier is in an open condition while the eyecup is in a twist-up condition.
Figure 26:
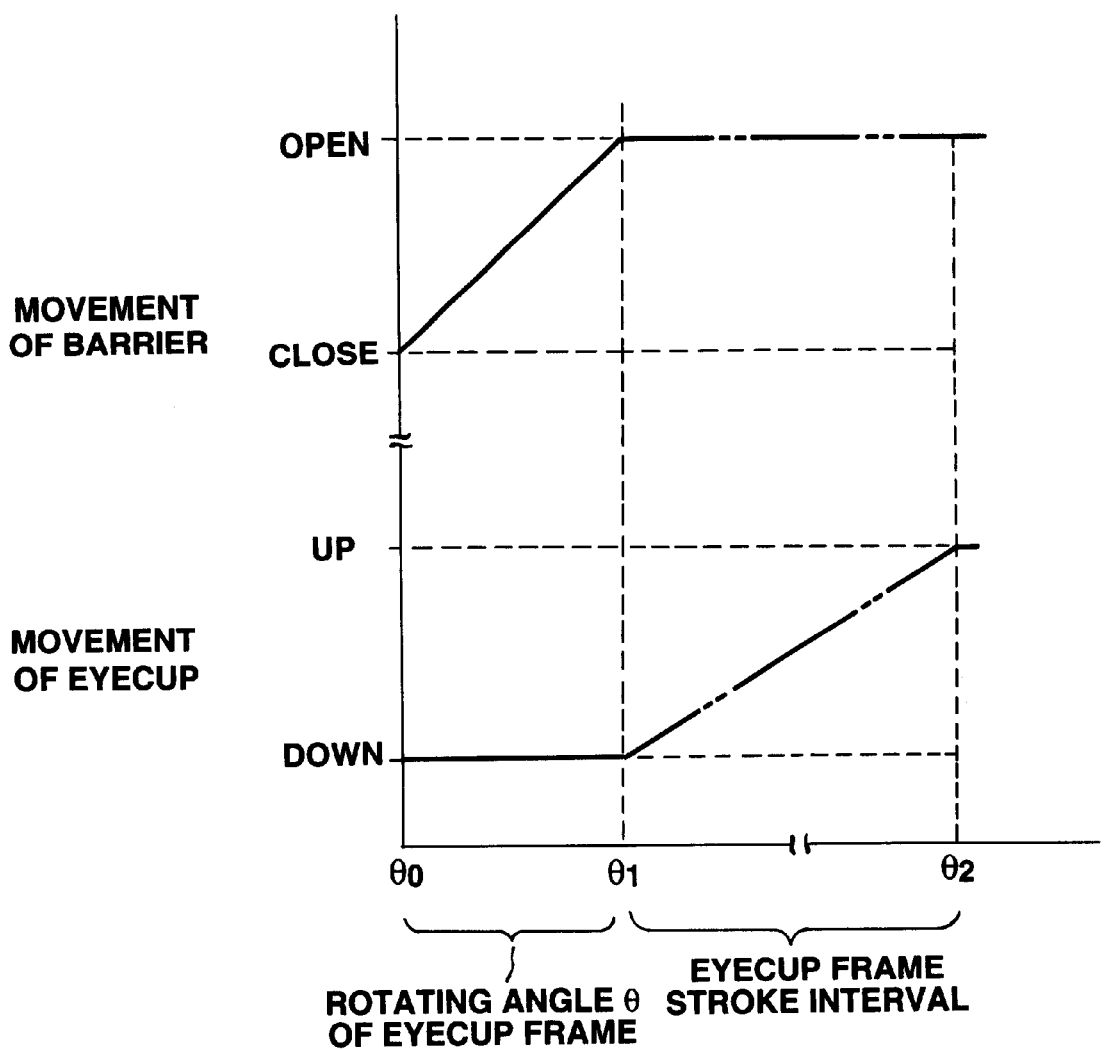
FIG. 26 is a graphical representation of movement of the barrier and movement (travel in optical axis directions) of the eyecup with respect to a rotating angle θ of an eyecup frame and a stroke in the binoculars according to the third embodiment.

FIG. 25 shows the non-stored state of these binoculars, and is a longitudinal cross-sectional view showing the barrier/eyecup section where the barrier is in the open condition while the eyecup is in the twist-up condition. FIG. 26 is a graphical representation of movement of the barrier and movement (travel in optical axis directions) of the eyecup with respect to a rotating angle θ and an optical axis direction travel of the eyecup frame in these binoculars.

When these binoculars are in the storage state, the eyecup 46 and the eyecup frame 45 are rotated up to the full clockwise position (rotational position of θ0 in FIG. 26) with respect to the eyepiece body 41, and the projections 41b and 41c reach the end portions of the circumferential-direction cam grooves.

Accordingly, as FIG. 20 shows, the eyecup 46 is at the down position where it, together with the eyecup frame 45, is drawn in on the eyepiece said body 41 side. Additionally, as FIG. 22 shows, the barriers 42 and 43 are rotated through the driving pins 45a and 45b up to the clockwise closing positions for the closure of the opening portion 41a so that the eyepiece 51 is in the protected condition.

For switching these binoculars to the non-storage state, the eyecup 46 is rotated counterclockwise by a predetermined angle, that is, the eyecup frame 45 is rotated counterclockwise over the ranges of the circumferential-direction cam groove portions 45m and 45e (from a rotational angle θ0 to a rotational angle θ1 in FIG. 26), so that the projections 41b and 41c are fitted in the cam groove switching portions.

Owing to the rotation of the eyecup frame 45, the barriers 42 and 43 are rotationally driven counterclockwise by the movements of the driving pins 45a and 45b, and the opening portion 41a is opened to provide for viewing as shown in FIG. 24. Meanwhile, the eyecup 46 is left at the down position as shown in FIG. 23.

For drawing the eyecup 46 out to the viewer side up position, the eyecup 46 and the eyecup frame 45 are shifted toward the viewer side along the optical axis. That is, where the rotational position is at an angle θ1 in FIG. 26, they are shifted until the projections 41b and 41c are fitted in the end portions of the straight cam groove portions. This makes the eyecup 46 move to the up position as shown in FIG. 17. At this time, because the eyecup frame 45 is not rotated, it is left as is, and the barriers 26 and 27 are maintained in the open condition shown in FIG. 24.

In addition, for holding the eyecup 46 at a middle position between the twist-up position and the twist-down position, the eyecup 46 is stopped within the stroke range in FIG. 26. Still further, for twisting the eyecup 46 down from the twist-up condition, the reverse to the above-mentioned operation is conducted, that is, the eyecup 46 is shifted toward the body 21 side. Moreover, for setting the barriers 42 and 43 to the closing condition, the eyecup frame 45 is further rotated clockwise to be returned up to the rotational angle θ0 in FIG. 26.

With the above-described binoculars according to the third embodiment, the opening and closing operations of the barriers can be achieved by the rotational operation of only the eyecup 46, a single operation member, and the up and down operations of the eyecup can be accomplished by advancing and retreating of the eyecup 46, which provides for easy-to-use operation. Additionally, the structures of the barrier section and the eyecup section are simple, thus presenting a compact configuration.

Although the constructions of the barrier sections and the eyecup sections in the above-described embodiments are for binoculars, this invention is also applicable to other optical apparatuses, including a telescope or a monocular.

As described above, with the optical apparatus according to this invention, the opening and closing operation of the barrier member and the advancing and retreating operation of the hood member (eyecup member) can be operated in an integrated manner which offers extremely excellent ease of use. Additionally, since this invention employs the structure in which the barrier member is held by the hood member, its configuration is simple, thus reduces manufacturing cost.

What is claimed is:

1. An optical apparatus comprising:
   an optical system having an optical axis;
   a hood member; and
   a barrier member positioned between one end portion of said hood member and an end portion of said optical system, said barrier member being moveable in a plane transverse to the optical axis between a position where said barrier member protects said optical system and a position where said barrier member separates from said optical system.

2. An optical apparatus according to claim 1, wherein said optical system is an eyepiece optical system, while said hood member is an eyecup member having an end portion adapted to contact a viewer.

3. An optical apparatus according to claim 1, further comprising holding means for holding said barrier member so that said barrier member is openable and closable, and further for holding said hood member so that said hood member is movable along a direction corresponding to an optical axis.

4. An optical apparatus according to claim 3, wherein said holding means serves as driving means for driving said hood member and said barrier member independently in a predetermined relation.

5. An optical apparatus according to claim 1, wherein said hood member is disposed to be movable along a direction corresponding to an optical axis, while said barrier member is driven to open and close in connection with a moving operation of said hood member along the direction.

6. An optical apparatus according to claim 1, wherein said barrier member is rotationally moveable in the plane.

7. An optical apparatus having an eyecup member, and a viewing optical system having an optical axis, the viewing optical system comprising:
   a barrier moveable in a plane transverse to the optical axis between a position where said barrier protects the viewing optical system and a position where said barrier separates from the viewing optical system; and an operating member operably connected to said barrier for opening and closing said barrier and for moving said eyecup member along a direction corresponding to the optical axis of the viewing optical system.

8. An optical apparatus according to claim 7, wherein said barrier protects an eyepiece of said viewing optical system.

9. An optical apparatus according to claim 7, wherein said operating member is a rotationally-driven member, and is driven rotationally to open and close said barrier and to move the eyecup member linearly.

10. An optical apparatus according to claim 9, wherein said operating member drives said barrier so that initial rotation thereof opens said barrier and moves the eyecup member linearly with rotation following the initial rotation.

11. An optical apparatus according to claim 7, wherein said operating member is a rotationally/straight driven member that is driven rotationally to open and close said barrier, and is driven straight to move the eyecup member linearly.

12. An optical apparatus according to claim 11, wherein rotation of said operating member is inhibited when the eyecup member is moved linearly.

13. An optical apparatus according to claim 7, wherein said operating member drives said barrier and the eyecup member through the use of a cam mechanism.

14. An optical apparatus according to claim 7, wherein said barrier is rotationally moveable in the plane.

15. An optical apparatus comprising:

an optical system having an optical axis;

a barrel for holding said optical system;

a barrier member moveable in a plane transverse to the optical axis between a state of sheltering said optical system and a state of releasing said optical system; and barrier moving means operated rotationally about the optical axis of said optical system to move said barrier member relative to said optical system.

16. An optical apparatus according to claim 15, further comprising an eyecup member having an end portion adapted to contact an operator, said barrier moving means, after moving said barrier member, further moving said eyecup member along the optical axis by the continued rotation of said barrier moving means about the optical axis of said optical system.

17. An optical apparatus according to claim 15, wherein said barrier moving means drives said barrier member through the use of a cam mechanism.

18. An optical apparatus according to claim 17, wherein said cam mechanism comprises a circumferentially-extending cam in said barrel and an inclined cam inclined with respect to an axis of said barrel, with said circumferentially-extending cam and said inclined cam being continuous.

19. An optical apparatus according to claim 17, wherein said cam mechanism comprises a circumferentially-extending cam in said barrel and a straight cam extending parallely to an axis of said barrel, with said circumferentially-extending cam and said straight cam being continuous.

20. An optical apparatus according to claim 15, wherein said barrier member is rotationally moveable in the plane.

21. An optical apparatus comprising:

a viewing optical system having an optical axis;

an eyecup member;

an eyecup holding member for holding said eyecup member;

a barrier member movable between a closed position where said barrier member protects said viewing optical system and an open position where said barrier member separates from said optical system; and an operating member which is driven rotationally within a predetermined rotation range around said optical axis to move said barrier member between said open and closed positions and further driven to move said eyecup member along said optical axis of said viewing optical system, wherein said barrier member is opened and closed in a first range of said rotation range of said operating member, and said eyecup member is moved along said optical axis in a second range which is continuous with said first range.

22. An optical apparatus according to claim 21 comprising:

a first cam groove corresponding to said first range;

a second cam groove corresponding to said second range, said first and second cam grooves provided in said operating member; and cam followers, which engage said first and second cam grooves, provided on said eyecup holding member, wherein the first cam groove is provided in a direction perpendicular to said optical axis, and the second cam groove is inclined by a predetermined angle with respect to said optical axis.

23. An optical apparatus comprising:

a viewing optical system having an optical axis;

an eyecup member;

a barrier member movable between a closed position where said barrier member protects said viewing optical system and an open position where said barrier member separates from said optical system;

an operating member which is driven rotationally within a predetermined rotation range around said optical axis to move said barrier member between said open and closed positions and further driven to move said eyecup member along said optical axis of said viewing optical system; and a body member which supports said operating member, wherein said barrier member is opened and closed in the rotation range in which said operating member is rotated, and said eyecup member is moved along said optical axis in a linear-movement range of said operating member which is continuous with said rotation range.

24. An optical apparatus according to claim 23 comprising:

a first guide groove corresponding to said rotation range;

a second guide groove corresponding to said linear-movement range, said first and second guide grooves provided in said operating member; and protruding portions, which engage said first and second guide grooves, provided on said body member, wherein said first guide groove is perpendicular to said optical axis, and said second guide groove is parallel with said optical axis.

* * * * *